UNITED STATES PATENT OFFICE.

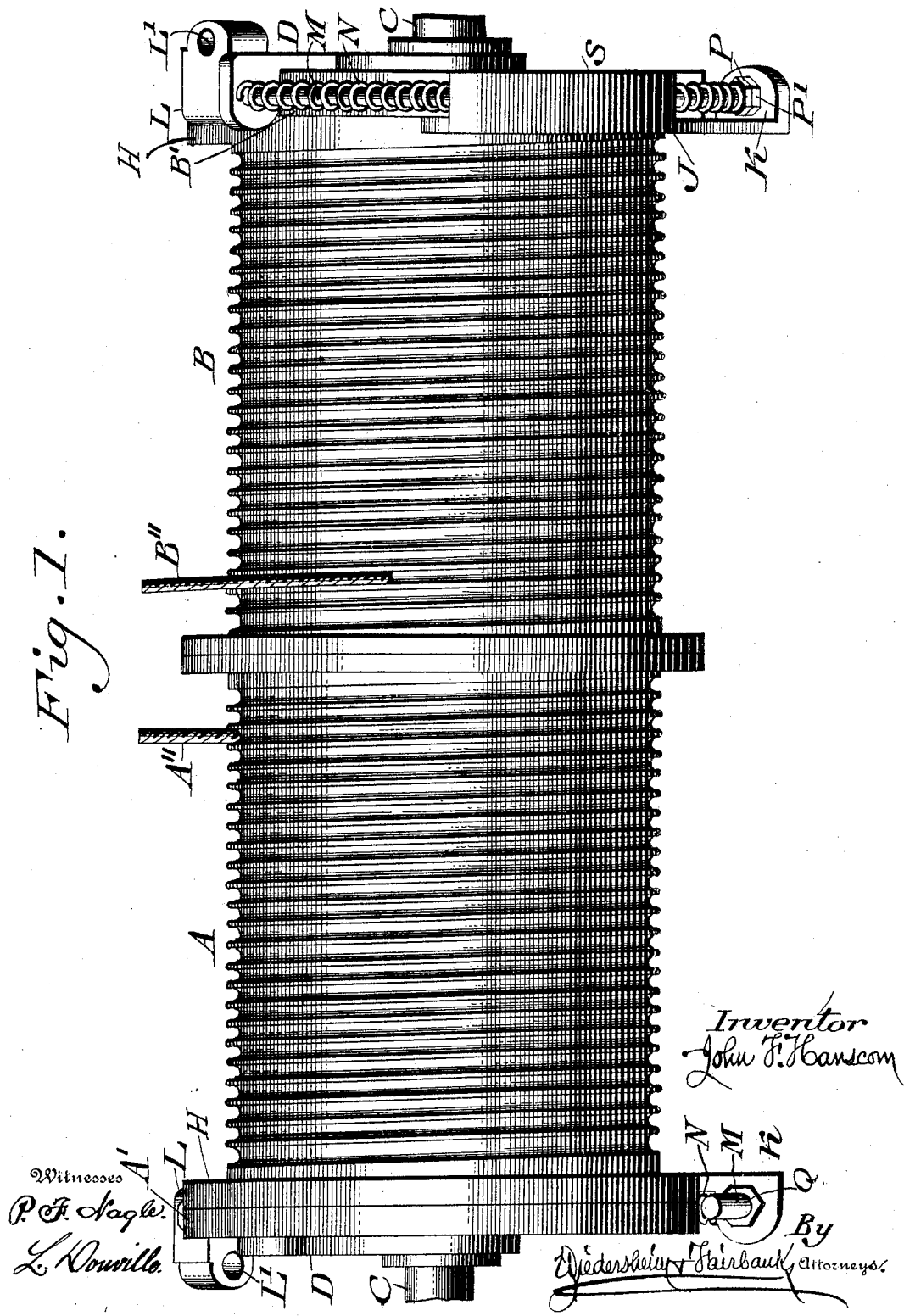

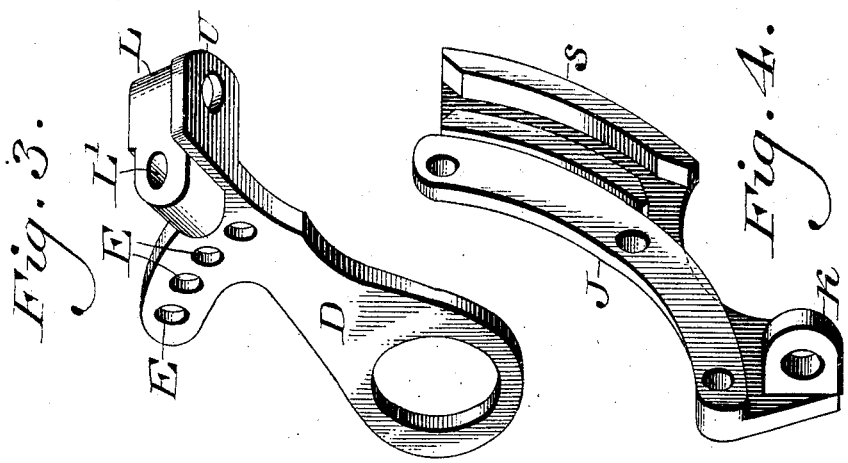
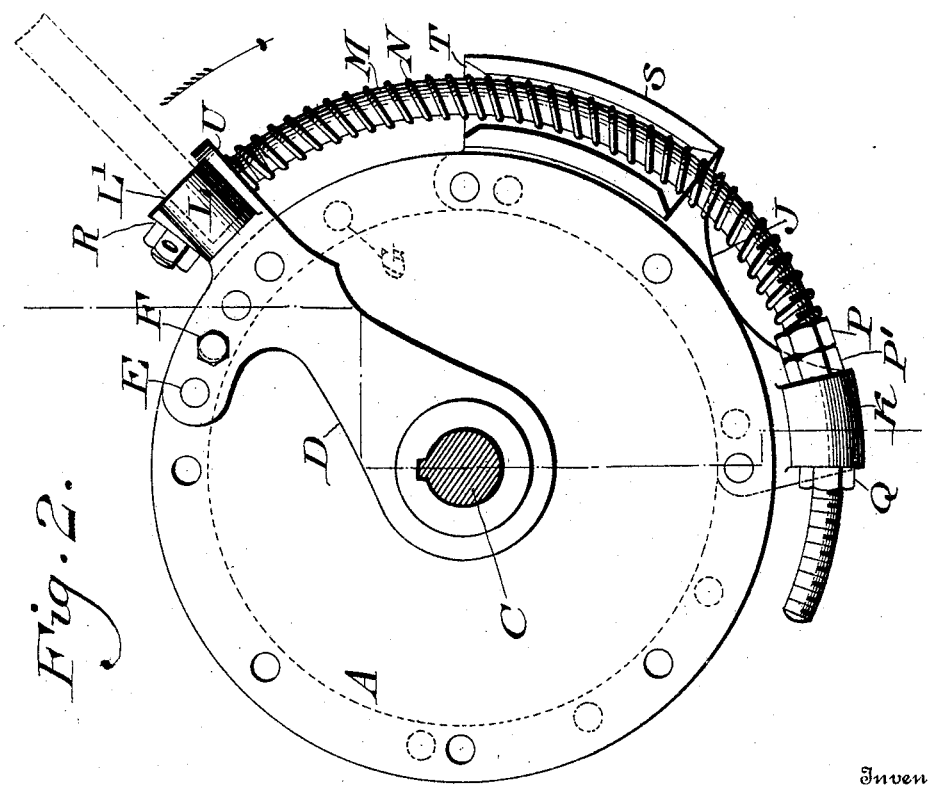

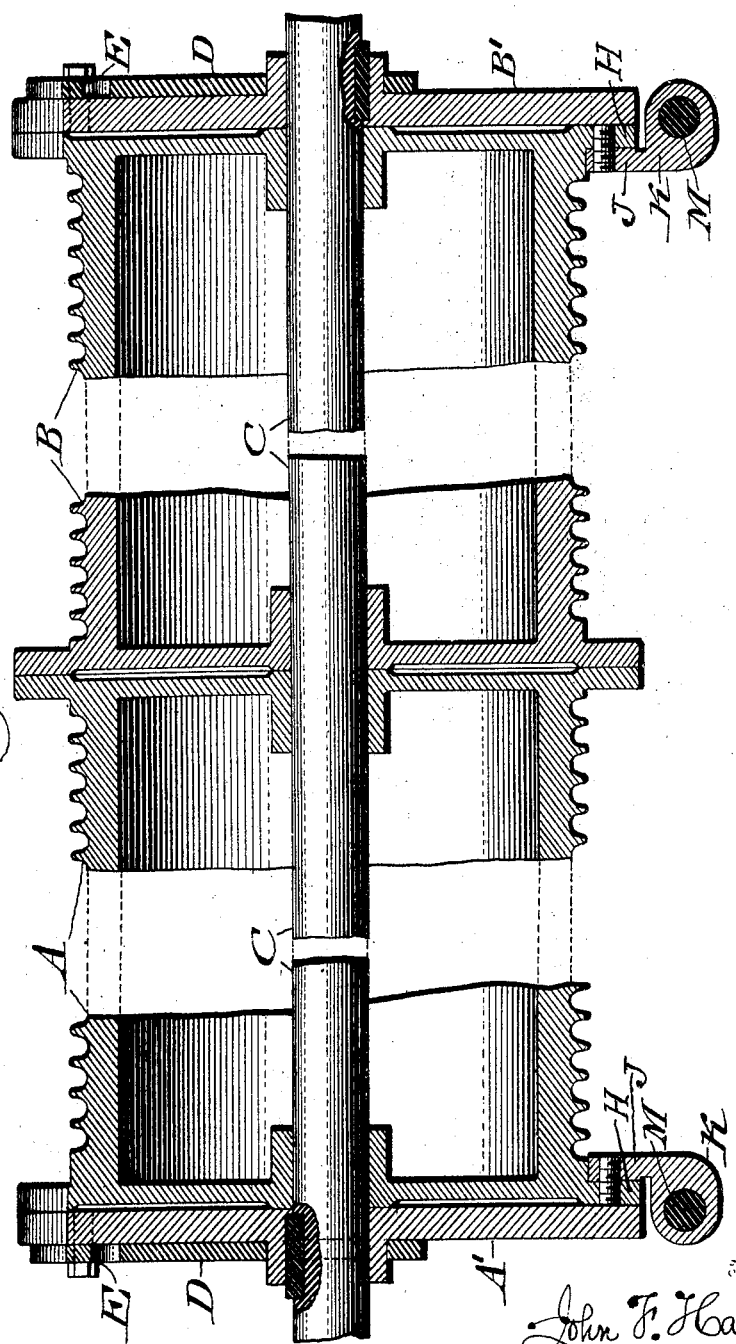

JOHN F. HANSCOM, OF PHILADELPHIA, PENNSYLVANIA.

APPARATUS FOR TAKING UP THE SLACK IN THE STEERING-ROPES OF VESSELS.

No. 796,720.  Specification of Letters Patent.  Patented Aug. 8, 1905.

Application filed November 5, 1904. Serial No. 231,535.

*To all whom it may concern:*

Be it known that I, JOHN F. HANSCOM, a citizen of the United States, residing in the city and county of Philadelphia, State of Pennsylvania, have invented a new and useful Apparatus for Taking Up the Slack in the Steering-Ropes of Vessels, of which the following is a specification.

My invention relates to an improvement in an apparatus for taking up the slack in the steering-ropes of vessels, as set forth in the Letters Patent of the United States, No. 379,461, granted to me on the 13th day of March, 1888. In said patent the apparatus shown is composed in part of adjustable drums, around which are passed the ropes used in connection with the steering-gear, the apparatus being, however, adapted for taking up the slack of the ropes by the use of a lever. In the present case provision is also made for taking up the slack of the ropes by automatic action, as will be hereinafter further explained.

Figure 1 represents a plan view of a portion of an apparatus embodying my invention. Fig. 2 represents an end elevation thereof. Figs. 3 and 4 represent perspective views of detached parts. Fig. 5 represents in section the disks and portion of the drums on the shaft.

Similar letters of reference indicate corresponding parts in the figures.

Referring to the drawings, A and B designate drums which are mounted loosely on the shaft C between the disks A' and B', which are keyed to said shaft, the peripheries of said drums being spirally grooved and having passed around them the steering-ropes A" B", the same being wound thereon in opposite directions and leading to the forward part of vessel and around a single drum on a shaft that is actuated by the steering-wheel in pilot-house or elsewhere and the introduction of the necessary beveled gears, by which combination the shaft C is revolved by the helmsman and the steering-engine valve controlled by its connection with said shaft C and the vessel guided, the single rope-drum and shaft not being shown in the present case, they being similar to those in the patent above referred to.

D designates arms respectively loose on the faces of the disks A' B', each of said arms being mounted on the hub of the respective disk, shaft C, and having in its peripheral portion a series of openings E to receive a bolt F, which is adapted to enter an opening G in the fixed disks above referred to for the purpose of confining the arm D and for primary adjustment of the apparatus.

Permanently connected with the outer peripheral flange H of each loose drum is the casting or plate J, which is adapted to be adjustably connected with the respective disk A' or B' by the segmental rod M, which is encircled by the coil-spring N. K designates a boss on one end of said plate J, and L designates a boss on the outer end of said arm D. Passing through said bosses is the segmental rod M, secured at one end to the casting K by means of nuts P Q, the other end passing loosely through the boss L with a nut R to prevent it from passing entirely out of said boss, the initial tension of the coil-spring being adjusted by the nut P, the other nut P' being a jam-nut.

Connected with and forming a part of each casting J on the portion corresponding to the periphery of the drum is a partially tubular guide S for the rod and spring to prevent any further outward curvature of the rod and spring.

It will be noted that the ropes in question are generally and chiefly employed for actuating steering-ropes of engine-valves on shipboard and are made of metal and passed through heated compartments, such as engine and fire rooms, so that while in use they are expanded to some extent, and therefore liable to ride out of the spiral grooves of the loose drums and on tops of adjacent parts.

Each loose drum is primarily adjusted by means of a lever, such as shown in dotted lines, Fig. 2, the same being inserted in the eye L' on the boss L, and then moving the arm D in the direction of the arrow, which forces the drum circumferentially thereon without compressing the spring N until the slack is taken out of the rope. Then said arm D is further forced by the lever until the end or surface T of the casting J contacts with the side or surface U of the boss L, this then causing the necessary compression of said spring for efficient action. The bolt G is then inserted in the proper opening in said arm and the face of the disk, so as to preserve the adjusted compression of the spring. The apparatus is now in condition for operation, and should there be further expansion of the rope the spring will immediately act to cause a rotation of the drum, and thus take up the slack of either rope as it develops alternately by movement of the wheel to port or starboard.

It will be observed that the parts shown in Fig. 2 which are located at the left side of the loose drum A, as in Fig. 1, will be duplicated on the right of the loose drum B, as shown in said Fig. 1, so that each drum will be operative in the event of the rope thereof becoming slack, it being evident that the drums have independent motions and the ropes are wound thereon respectively in reverse direction, as shown in the patent heretofore granted to me and referred to.

Various changes may be made in the details of construction shown without departing from the general spirit of my invention, and I do not, therefore, desire to be limited in each case to the same.

Having thus described my invention, what I claim as new, and desire to secure by Letters Patent, is—

1. In steering apparatus, a loosely-mounted drum and a steering-rope thereon and means for automatically rotating said drum and taking up the slack of said rope.

2. In steering apparatus, a loosely-mounted drum, a shaft on which the same is mounted, members connected with said drum, a rod firmly engaged at one end with one of said members and freely engaged at the other end with the opposite member and a spring on said rod interposed between said members.

3. In steering apparatus, a loosely-mounted drum, a member mounted on the shaft of said drum and provided with means for adjustable connection with the head of said drum, another member on said drum, a spring interposed between said members and a carrier for said spring respectively fixed by and freely connected with said members.

4. In steering-gear, a loosely-mounted drum, members on said drum at different parts of the periphery thereof, a spring extending from one member to the other and a guard for said spring freely inclosing the same.

5. In steering-gear, a loosely-mounted drum, members on said drum at different parts of the periphery thereof, a spring extending from one member to the other, a carrier for said spring respectively fixed by and freely connected with said members and a guard for said spring and carrier freely inclosing the same.

6. In a steering-wheel, a loosely-mounted drum or drums, and a spring or springs adapted to be circumferentially adjusted on said drums and attached at different points of the periphery of said drums and a member or members connected with said drums adapted to carry said spring or springs and permit it or them to expand and contract thereon.

7. In steering apparatus, a loosely-mounted drum, a rope thereon and means for automatically controlling the latter to take up the slack thereof, consisting of a spring attached to said drum and adapted to rotate the latter when slack in said rope occurs to take up the same.

8. In steering apparatus, a loosely-mounted drum, a rope thereon, a spring and members connecting said spring with said drum adapted to be actuated by said spring to rotate said drum when slack in said rope occurs to take up the same.

JOHN F. HANSCOM.

Witnesses:
   JOHN A. WIEDERSHEIM,
   S. R. CARR.